United States Patent
Yoshida et al.

(10) Patent No.: US 10,852,874 B2
(45) Date of Patent: Dec. 1, 2020

(54) METHODS AND APPARATUS FOR THREE-DIMENSIONAL TOUCH SENSING WITH LOAD SENSORS

(71) Applicant: Massachusetts Institute of Technology, Cambridge, MA (US)

(72) Inventors: Takatoshi Yoshida, Cambridge, MA (US); Hiroshi Ishii, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/677,454

(22) Filed: Nov. 7, 2019

(65) Prior Publication Data
US 2020/0150814 A1    May 14, 2020

Related U.S. Application Data

(60) Provisional application No. 62/757,661, filed on Nov. 8, 2018.

(51) Int. Cl.
  *G06F 3/041* (2006.01)
  *G06F 3/044* (2006.01)
(52) U.S. Cl.
  CPC ........... *G06F 3/0414* (2013.01); *G06F 3/044* (2013.01); *G06F 2203/04104* (2013.01); *G06F 2203/04808* (2013.01)
(58) Field of Classification Search
  CPC ............. G06F 3/0414; G06F 3/044; G06F 2203/04808; G06F 2203/04104; G06F 3/0393; G06F 3/04186; G06F 3/04144; G01L 5/16; G01L 5/228; G01L 1/00
  See application file for complete search history.

(56) References Cited

U.S. PATENT DOCUMENTS

| | | | |
|---|---|---|---|
| 8,578,298 B2 * | 11/2013 | Yoshimi | G06F 3/04886 715/846 |
| 9,465,477 B2 | 10/2016 | Rosenberg et al. | |
| 2003/0214481 A1 * | 11/2003 | Xiong | G06F 3/038 345/157 |
| 2006/0128468 A1 * | 6/2006 | Yoshikawa | A63F 13/426 463/36 |
| 2012/0005624 A1 * | 1/2012 | Vesely | G06F 3/04842 715/808 |

(Continued)

OTHER PUBLICATIONS

Carvey, A., et al., Rubber shark as user interface; published in CHI Extended Abstracts 2006: 634-639, Apr. 2006.

(Continued)

*Primary Examiner* — Muhammad N Edun
(74) *Attorney, Agent, or Firm* — Stephen R. Otis

(57) ABSTRACT

An object may rest on top of a sensor structure. Multiple 3-axis load sensors may be embedded in the sensor structure, and may take measurements of a force created by a human user touching the object. The direction of the force may fluctuate slightly, due to tiny shaking movements of the user's hand or finger while the hand or finger touches the object. These tiny shaking movements may occur even in a normal, healthy person. Based on these measurements of fluctuating force that are taken by the load sensors, a computer may calculate three-dimensional spatial coordinates of a point at which the user is touching the object.

13 Claims, 3 Drawing Sheets

(56) References Cited

U.S. PATENT DOCUMENTS

2013/0332892 A1* 12/2013 Matsuki .................. G06F 3/016
715/863
2019/0101754 A1* 4/2019 Bharti ................. G06F 3/03545

OTHER PUBLICATIONS

Hudin, C., et al., Intact: Instant Interaction for 3D Printed Objects; published in CHI Extended Abstracts 2016, May 2016.

Jorda, S., et al., The reacTable: exploring the synergy between live music performance and tabletop tangible Interfaces; published in Proceedings of the 1st international conference on Tangible and embedded interaction, TEI 07, pp. 139-146, Feb. 2007.

Murao, K., et al., Recognizing activities and identifying users based on tabletop activities with load cells; published in Proceedings of the 17th International Conference on Information Integration and Web-based Applications & Services, iWAS '15, Article No. 39, Dec. 2015.

Rosenberg, I., et al., The UnMousePad: an interpolating multi-touch force-sensing input pad; published in ACM Transactions on Graphics (TOG), vol. 28, Issue 3, Article No. 65, Aug. 2009.

Schmidt, A., et al., Context Acquisition Based on Load Sensing; published in Proceedings of the 4th international conference on Ubiquitous Computing, UbiComp '02, pp. 333-350, Sep. 2002.

* cited by examiner

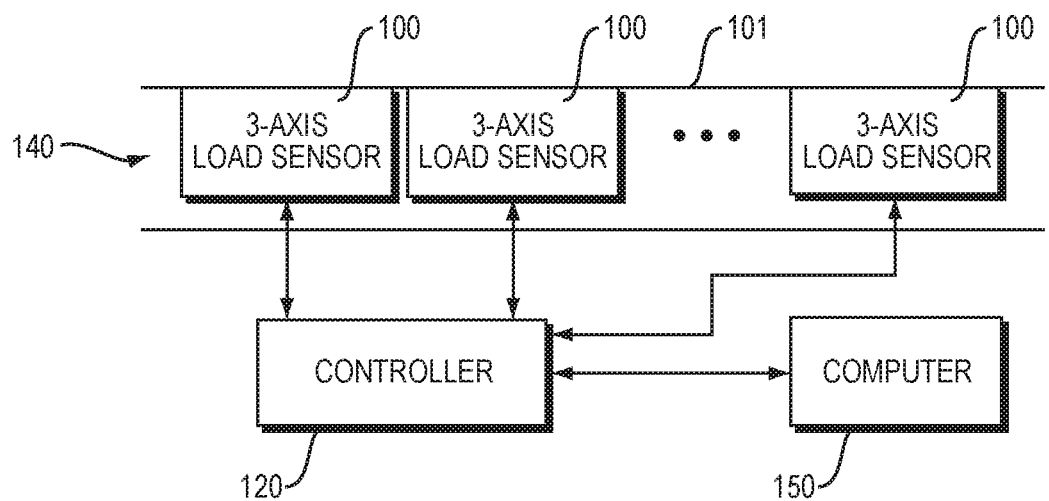
FIG. 1
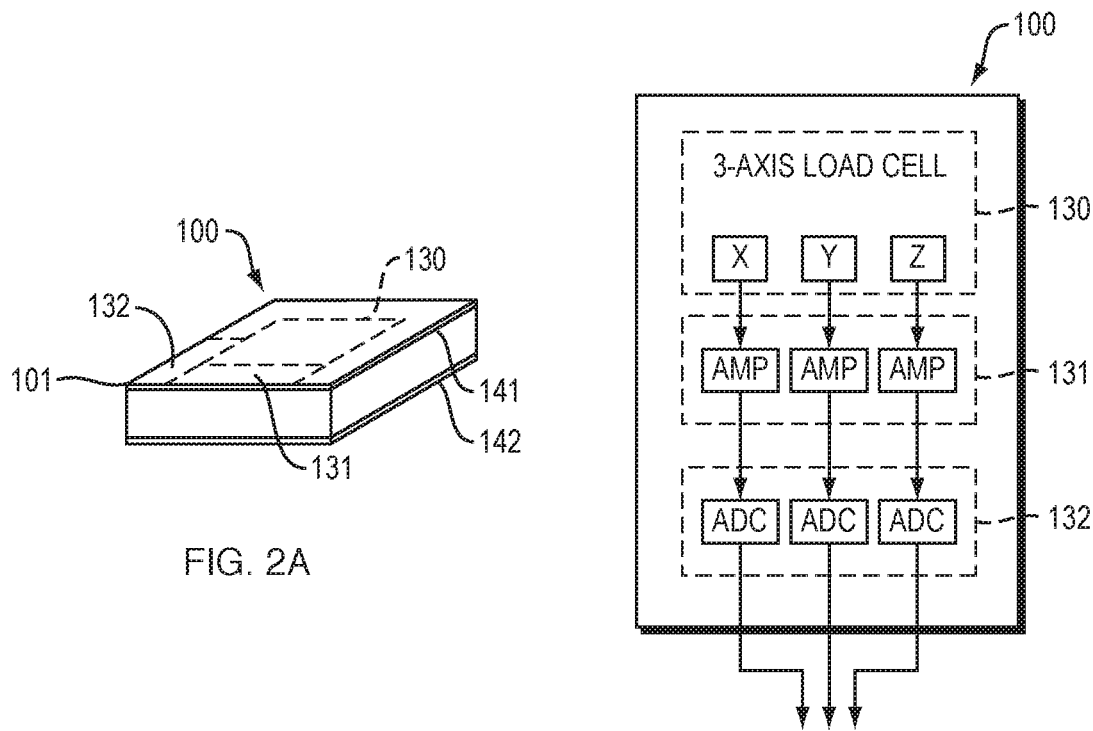
FIG. 2A
FIG. 2B

METHODS AND APPARATUS FOR THREE-DIMENSIONAL TOUCH SENSING WITH LOAD SENSORS

RELATED APPLICATIONS

This application claims the benefit of U.S. Provisional Application No. 62/757,661 filed Nov. 8, 2018 (the "Provisional").

FIELD OF TECHNOLOGY

The present invention relates generally to touch sensing with load sensors.

COMPUTER PROGRAM LISTING

The following three computer program files are incorporated by reference herein: (1) ActionLine.txt with a size of about 4 KB; (2) IntersectionFinder.txt with a size of about 11 KB; and (3) TouchFinder.txt with a size of about 15 KB. Each of these three files were created as an ASCII .txt file on Nov. 5, 2019.

SUMMARY

In illustrative implementations of this invention, a sensor system includes multiple 3-axis load sensors that are housed in a sensor structure. For instance, the sensor structure may have a flat upper surface.

The system may detect, based on measurements taken by the load sensors, the three-dimensional (3D) spatial coordinates of a point at which a human user physically touches a solid object that is resting on the sensor structure.

In illustrative use scenarios, a solid, physical object rests on the sensor structure. A human user may touch a point (touch point) on the object. The touch point may be above the sensor structure. For instance, in some cases, the touch point is located at a vertical distance above the sensor structure that is at least 10 cm, or at least 20 cm, or at least 30 cm, or at least 40 cm, or at least 50 cm.

In illustrative implementations, the sensor system detects—based on load measurements taken by the 3-axis load cells—not only the horizontal (x, y) spatial coordinates of the touch point, but also the vertical (z) coordinate of the touch point.

In some use scenarios, the sensor system detects the 3D spatial coordinates of the touch point (at which the user is touching a solid object that is resting on the sensor structure) without prior knowledge of the size or shape of the solid object.

When a human user touches a point on an external surface of the solid object (which is resting on the sensor structure), the user applies a force against the object. This force may be transmitted through the solid object—and be measured by—the 3-axis load sensors in the sensor structure. This force may be mathematically described by a force line. The force line may be a geometric line that intersects the sensor plane. The sensor plane may be a geometric plane that intersects each of the 3-axis load sensors.

In illustrative implementations, a single force line by itself: (a) does not provide enough information to determine the 3D location of the touch point; and (b) merely indicates that the touch point is somewhere along the force line, at or above the sensor structure.

To overcome this ambiguity, the sensor system may leverage the fact that the finger of a healthy, normal user typically shakes in tiny movements when a user presses a finger against a surface. These normal, small shaking movements, which every healthy person has, may comprise a physiologic tremor. Because the user's finger is shaking (in rapid tiny movements) while the finger touches the object, the finger exerts a force (against the object being touched) that slightly fluctuates in direction.

To capture these small fluctuations in force, the sensor system may take multiple samples at different times during a short time interval, while a user's finger is touching a solid object (which is resting on the sensor structure). For instance, in some cases, the sensor system takes more than 20 samples in less than half of a second. Each sample may be taken at a different time. Each sample may consist of load measurements taken by the sensor system at a particular time. For instance, if the sensor system has three 3-axis load sensors, then a single sample may consist of 9 measurements (because each of the three 3-axis load sensors may take three measurements of loads along x, y and z axes).

Based on these multiple samples, multiple force lines may be calculated, one force line per sample. This is because, during the short time interval in which the samples are taken, the finger undergoes rapid, small shaking movements and thus the force exerted by the finger against the object rapidly changes. During the short time interval, the position of the touch point may remain constant.

Based on these multiple force lines (which are due to tiny shaking movements of the finger), the most likely touch point may be calculated.

For instance, the most likely touch point may be estimated by solving a least squares problem. The least squares solution may be computed by performing a Moore-Penrose pseudo-inverse matrix algorithm with generalized Tikhonov regularization. For instance, two regularization parameters may be employed in the generalized Tikhonov regularization (instead of using only one regularization parameter).

This process may be repeated to find multiple different touch points (at which a user touches a solid object that is resting on the sensor structure). Data regarding these multiple touch points may be saved in memory. We sometimes call these saved touch points "registered touch points".

In the method described above, the sensor system takes multiple load sensor samples (e.g., more than 20 and less than 200 samples) in order to estimate 3D spatial coordinates of a single touch point.

In other use scenarios, the sensor system estimates 3D spatial coordinates of a touch point, based on only a single new sample, by leveraging information about registered touch points. For instance, after a single new sample is acquired, a computer may calculate a new force line for the new sample, and then perform three steps. First, the computer may select a small set of candidate point(s). The candidate points may be the registered touch point(s) that are located inside a geometric cylinder, where the central axis of the cylinder is the new force line and the radius of the cylinder is a specified threshold distance. Second, the computer: (a) may determine which candidate point has a force line that is most similar in direction to the force line for the new sample; and (b) may determine that this candidate point is the touch point. To determine similarity of direction, the computer may compute, for each specific candidate point, a dot product of: (a) a normalized direction vector for the force line associated with the specific candidate point; and (b) a normalized direction vector for the new force line. The computer may select, as the touch point, the candidate point for which the dot product is the greatest.

In illustrative implementations, the solid object (which is touched by the user and rests on the sensor structure) is rigid.

This invention has many practical implementations. Here are two non-limiting examples.

First, the sensor system may enable a particular point on an external surface of a physical object (which is resting on the sensor structure) to function as a virtual control button. When a user touches the particular point: (a) the sensor system may detect the 3D spatial coordinates of the particular point; and (b) the touch may be treated as if the user touched the virtual control button. For example, if the particular point functions as a virtual volume control, then a computer may interpret a user's touch at the particular point as an instruction to change a volume level.

Second, the sensor system may be employed to detect the shape of a solid object that is resting on the sensor structure. To do so, the sensor system may measure 3D spatial coordinates of multiple touch points. Each of the touch points may be on the external surface of the solid object. Based on these multiple touch points, the shape of an external surface of the object may be estimated.

In some implementations of this invention, each 3-axis load sensor is in a separate module (which is embedded in the sensor structure). This modular design enables the sensor system to be adjusted to handle different weights of loads. For instance, to measure a heavier load: (a) the number of modules may be increased, or (b) existing modules may be replaced by other modules that have a higher load tolerance. Furthermore, the modular design enables the sensor system to be adjusted to handle a wide variety of spatial configurations of the load, by adjusting the positions of the modules in the sensor structure. In some use scenarios, multiple users interact with the sensor system simultaneously, and different modules are employed to detect touch by different users.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

FIG. 1 shows hardware for a load-sensing system.

FIG. 2A is a perspective view of a 3-axis load sensor.

FIG. 2B is a block diagram of a 3-axis load sensor.

Figure 3:
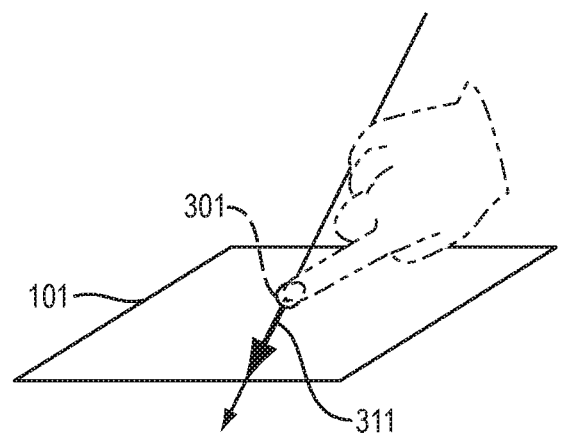
FIG. 3 illustrates a finger pressing directly against a sensor surface.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

System Hardware

In illustrative implementations of this invention, a sensor system includes 3-axis load sensor modules, a microcontroller and a host computer.

Each load sensor module may include a three-axis load cell and peripheral circuits to transmit load data to controllers. Data from the sensor modules may be sent to the microcontroller. The microcontroller may pre-process the data by performing noise filtering. The noise filter may be desirable, because the raw data from load cells may be polluted with sporadic saturated signals. The noise filtering may eliminate outliers by applying a maximum threshold on the absolute value of the raw data. Put differently, the noise filter may filter out (eliminate) data for which the magnitude of the measured force exceeds a specified threshold.

In illustrative implementations, the host computer receives filtered load data from the microcontroller (e.g., through a USB serial bus). If the number N of load sensor modules is less than or equal to three, then the host computer may receive an array of 3N load data. The host computer may calculate, based on the filtered load data, force and its intersection with a sensor plane. The host computer may feed the force information as input into processing pipelines for 3D touch detection and 3D shape detection.

FIG. 1 shows hardware for a load-sensing system. In FIG. 1, a sensor system comprises multiple 3-axis load sensors 100, a microcontroller 120, and a computer 150. The load sensors 100 are housed in sensor structure 140, take load measurements, and output data regarding these measurements. Microcontroller 120 filters this data (to reduce noise) and sends the filtered data to computer 150. Computer 150 processes and analyzes this filtered data.

In FIG. 1, the load sensors 100 each have a horizontal, top surface that is parallel to, and that is at the same vertical height as, a geometric plane. We sometimes call this geometric plane the "sensor plane" 101. In FIG. 1, the top surface of support structure 140 is located at the sensor plane 101. Alternatively, the top surface of support structure 140 may be vertically above, and parallel to, the sensor plane.

In FIG. 1, controller 120 and computer 150 are shown beneath load sensors 100. Alternatively, controller 120 and computer 150 may each be in any spatial position relative to load sensors 100 (e.g., to the side of them).

FIG. 2A is a perspective view of a 3-axis load sensor. FIG. 2B is a block diagram of the same 3-axis load sensor. In FIGS. 2A and 2B, a 3-axis load sensor 100 comprises a 3-axis load cell 130, three amplifiers 131 and three ADCs (analog-to-digital converters) 132. The 3-axis load cell 130 includes a first load cell that measures load along an x-axis, a second load cell that measures load along a y-axis and a third load cell that measures load along a z-axis, where the x-, y- and z-axes are perpendicular to each other. The three amplifiers 131 amplify analog signals from the x-, y- and z-load cells. The three ADCs 132 convert these amplified analog signals to digital signals and then send the digital signals to controller 120. In FIG. 2A, a load sensor 100 has a top layer 141 and a bottom top layer 142. These bottom and top layers may tend to grip materials that are adjacent to them. For instance, the top layer 141 may tend to grip the object that is resting on the sensor structure, and the bottom layer 142 may tend to grip a floor, shelf, or tabletop that is beneath the sensor structure. The top layer 141 and bottom layer 142 may each comprise a material (e.g., rubber or another polymer) that has a high coefficient of friction or that tends to adhere to adjacent surfaces (e.g., due to Van der Waals attractive forces).

The load measured by the load sensors 100 may be a mechanical force that is exerted by a user against a physical object (when the user touches the object) and that is transmitted through the physical object to the load sensors 100.

Force Line

In illustrative implementations of this invention, a human user presses against a solid object that is resting on a sensor surface—or presses directly against a sensor surface. By pressing, the user exerts a force f that has a direction and magnitude and that intersects the sensor plane at a particular intersection point a.

This line of force (force line) may be mathematically represented as a force f and intersection a.

In illustrative implementations of this invention, a computer may calculate force lines, based on load measurements. The load data may comprise sets of measured force $f_i$, sensed at i-th 3-axis load sensor module (i=1, 2, . . . , N).

For simplicity, we assume that all the load sensors are located on the same z=0 plane (which we sometimes call the "sensor plane"). Let $p_i$ be the position of the i-th load sensor. The touch force f may be expressed as $$f = \sum_i f_i.$$

The torque τ associated with a touch force may be expressed as $$\tau = \sum_i p_i \times f_i.$$

A force line (e.g., for a force exerted by a manual touch) may be expressed as x=a+pd, parameterized by scalar p, where d is the normalized direction vector d=f/|f|.

Touch Point

We sometimes call a spatial point, at which the user physically touches an object, a "touch point." For instance, the point at which a user touches a sensor surface is a "touch point". Likewise, the point at which a user touches a solid object (which is resting on a sensor surface) is a "touch point".

2D Touch Detection

In some use scenarios, a user presses a finger directly against the sensor plane. In these use scenarios, the vertical position of the touch point is known and is equal to zero. The horizontal x and y spatial coordinates of the touch point may be calculated, based on a force line.

Let anchor point $a_0$=f×τ/|f|$^2$. Since we may take an arbitrary point along the line as the anchor point, we may obtain the intersection a as the anchor point intersecting with the sensor plane. Specifically, the intersection a (of the force line with the sensor plane) may be calculated as $$a = a_0 - \frac{d_z}{a_{0z}} d,$$

where $d_z$ is the z-component of the normalized direction vector d and $a_{0z}$ is the z-coordinate of anchor point $a_0$. On this formulation, the scalar p becomes regularized by being zero at all times when the point is on the z=0 plane.

FIG. 3 illustrates a finger pressing directly against a sensor surface. Touch point 301 is the point at which the finger touches the sensor surface. In FIG. 3, touch point 301 is located in the sensor plane 101 and is at a vertical height of zero (z=0). Because touch point 301 is located in sensor plane 101, the 2D spatial position of touch point 301 may be determined from a single force line for a single sample. Put differently, in FIG. 3, the horizontal x, y spatial coordinates of touch point 301 may be determined from a single force line for a single sample.

3D Touch Detection

In some use scenarios, a user presses a finger against a solid physical object that is resting on a structure in which 3-axis load cells are embedded. In these use scenarios, the sensor system may—based on load measurements taken by the load cells—accurately detect the 3D spatial coordinates of the touch point (i.e., the point at which the user touches an external surface of the solid object).

To detect the 3D touch point, the system may exploit the fact that a finger undergoes rapid, very small shaking movements, even in healthy, normal individuals. For instance, in some cases, the finger of a normal, healthy user may tremble very slightly, in such a manner that it shakes at a rate that is less than or equal to 30 Hz and greater than or equal to 2 Hz. When the finger is touching the physical object, the finger's tiny shaking movements may exert a rapidly changing force against the object.

In illustrative implementations, the sensor system may take a sequence of samples during a short time period (e.g., more than 20 samples in less than a half of a second). Each of the samples may be taken at a different time. Each of the samples may consists of the load measurements taken by multiple 3-axis load sensors at a particular time in the sequence. The force lines for these samples may be quasi-parallel, but may have slight differences in direction. During the short time period, the position of the touch point may remain constant.

In illustrative implementations, based on the different force lines for the samples, a computer calculates a most likely touch point—i.e., calculates 3D spatial coordinates of the most likely point at which the user is touching the physical object.

In illustrative implementations, the sensor system may detect the 3D spatial coordinates of the touch point, without any prior information about the shape of the physical object that is being touched.

The physical object that is being touched may be any solid object. The object may be rigid. The material composition of the physical object may be either homogenous or heterogenous. In some use scenarios, the physical object is a composite material (e.g., a wooden desk with metal legs).

This invention is not limited to touching with a finger. Alternatively, any part of a user's body may touch the physical object at a touch point and the 3D spatial coordinates of the touch point may be estimated.

This invention is not limited to a human user touching an object. Any second physical object may touch a first physical object. In illustrative implementations: (a) a second physical object touches, at a touch point, a first physical object that is resting on a sensor structure in which load sensors are housed; and (b) the 3D spatial coordinates of the touch point are estimated.

Figure 4:
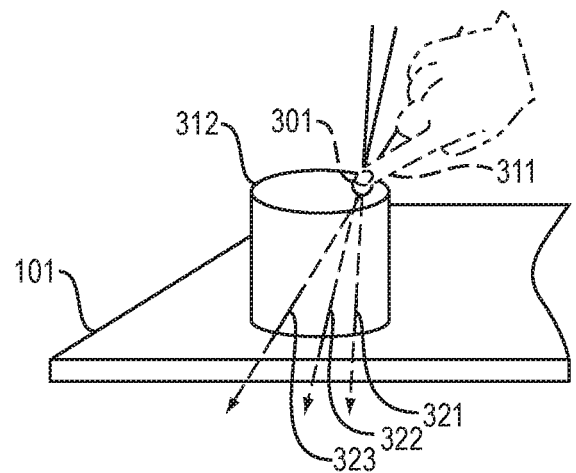
FIG. 4 illustrates a finger pressing against a solid object that is resting on a sensor surface.

FIG. 4 illustrates a finger 311 pressing against a solid physical object 312 that is resting on the top surface of a sensor structure. In FIG. 4, the top surface of the sensor structure—and of each of the load sensors—is located at and is parallel to the sensor plane 101. In FIG. 1, finger 311 is touching object 312 at touch point 301. Because the finger is shaking slightly, the force lines (e.g., 321, 322, 323) for different samples are oriented in slightly different directions.

In FIG. 4, when a force is exerted against object 312 (by the finger touching the object), the force is transmitted to the sensor structure.

We now explain how 3D touch may be detected, in illustrative implementations of this invention.

The equation for a force line x=a+pd may be transformed into the form of a matrix equation, where $I_3$ is a 3×3 identity matrix.

$$[I_3 \quad -d]\begin{bmatrix} x \\ p \end{bmatrix} = [a] \quad \text{(Equation 1)}$$

In Equation 1, d is a 3×1 column vector that is the transpose of $[d_x \; d_y \; d_z]$, where $d_x$, $d_y$, and $d_z$ are the x, y and z spatial coordinates of a normalized direction vector for a particular sample.

Equation 1 is apparently under-determined. Equation 1 may be modified to make it over-determined, in order to calculate the touch point x=[x y z] by the pseudo-inverse matrix method. The touch point x may be assumed to be constant during a touch. Because a hand quivers (e.g., shakes) slightly during a touch, the sensor system may detect different force lines $x=a_t+p_t d_t$ during a time period in which a touch occurs, where the discrete time stamp is denoted as t. The 3-axis load sensors may collect the most recent T samples of data during the touch. The matrix equation in Equation 1 may be expanded as follows:

$$\begin{bmatrix} I_3 & -d_1 & 0 & \ldots & 0 \\ I_3 & 0 & -d_2 & \ldots & 0 \\ \vdots & \vdots & \vdots & \ddots & \vdots \\ I_3 & 0 & 0 & \ldots & -d_T \end{bmatrix} \begin{bmatrix} x \\ p_1 \\ \vdots \\ p_T \end{bmatrix} = \begin{bmatrix} a_1 \\ \vdots \\ a_T \end{bmatrix} \quad \text{(Equation 2)}$$

In Equation 2: (a) x is a column vector of the x, y and z coordinates of the touch point, i.e., x is the transpose of [x y z]; (b) each 0 is a 3×1 column vector that is the transpose of [0 0 0], (c) the subscript T is the number of samples (where each sample consists of load measurements taken at a particular time); (d) each a is a 3×1 column vector that is the transpose of $[a_x \; a_y \; a_z]$, where $a_x$, $a_y$, and $a_z$ are the x, y and z spatial coordinates of an intersection point at which a force line (for a particular sample) intersects the sensor plane; (e) each d is a 3×1 column vector that is the transpose of $[d_x \; d_y \; d_z]$, where $d_x$, $d_y$, and $d_z$ are the x, y and z spatial coordinates of a normalized direction vector for a particular sample; (e) $I_3$ is a 3×3 identity matrix; and (f) each p is a scalar parameter for a force line for a particular sample.

For simplicity, we may abbreviate Equation 2 as DX=A, where $D \in R^{3T \times (T+3)}$, $X \in R^{T+3}$ and $A \in R^{3T}$. In the preceding sentence, T is the number of samples (where each sample consists of load measurements taken at a particular time).

The force lines may be quasi-parallel. Equation 2 may be solved by the support of regularization terms. A least-squares solution X for Equation 2 may be computed by a Moore-Penrose pseudo-inverse matrix algorithm with generalized Tikhonov regularization. Using this algorithm, the solution x (i.e., the touch point): (a) may tend to be constrained around the origin of the coordinate system; and (b) may get closer to the sensor plane under the influence of the regularization on $p_i$. In the preceding sentence: (a) the origin of the coordinate system may be a point in the sensor plane (e.g., at the centroid of the load sensor modules); (b) the z-axis of the coordinate system may be perpendicular to the sensor plane; and (c) the x-axis and y-axis of the coordinate system may be parallel to the sensor plane.

In illustrative implementations of this invention, generalized Tikhonov regularization (rather than the standard Tikhonov method with a uniform regularization parameter λ) is employed to obtain a stable solution X by reducing the effect of sensing errors. In this generalized Tikhonov regularization, two regularization parameters are employed: (a) $\lambda_x$ for the touch point x and (b) $\lambda_p$ for the scalar parameter $p_i$. In illustrative implementations, this is advantageous because these two regularization parameters ($\lambda_x$ and $\lambda_p$) do not relate to the same dimensions. Specifically, $\lambda_x$ relates to the touch point x which has coordinates with spatial dimensions (e.g., in millimeters). In contrast, $\lambda_p$ relates to $p_i$, which is a dimensionless scalar. These two regularization parameters (which are used for the generalized Tikhonov regularization) may be selected heuristically. In a prototype of this invention, the following values were employed: 20 for T, 0.1 for $\lambda_x$ and 0.01 for $\lambda_p$. However, this prototype is a non-limiting example of this invention. Other values of T, $\lambda_x$ and $\lambda_p$ may be employed in other implementations of this invention.

Recall that, in the abbreviated version of Equation 2 (DX=A), the column vector X is the transpose of [x y z $p_1$ $p_2$ . . . $p_T$]. Recall that the first three elements of X (i.e., x, y and z) are the x, y and z spatial coordinates of the touch point x.

In illustrative implementations of this invention, the column vector X may be calculated as $$X = (D^T D + \text{diag}(\lambda_x^2, \lambda_x^2, \lambda_x^2, \lambda_p^2, \ldots, \lambda_p^2))^{-1} D^T A \quad \text{(Equation 3)}$$

In Equation 3: (a) the superscript T means transpose; (b) −1 indicates an inverse matrix; (c) $\text{diag}(\lambda_x^2, \lambda_x^2, \lambda_x^2, \lambda_p^2, \ldots, \lambda_p^2)$ is a diagonal matrix whose diagonal elements are $\lambda_x^2, \lambda_x^2, \lambda_x^2, \lambda_p^2, \ldots, \lambda_p^2$; (d) $\lambda_x^2$ is $\lambda_x$ squared; and (e) $\lambda_p^2$ is $\lambda_p$ squared. Furthermore, in Equation 3: (a) A is the column vector on the right side of Equation 2, specifically A is the transpose of $[a_1 \ldots a_T]$; (b) X is the column vector in the middle of Equation 2, specifically, X is the transpose of [x y z $p_1$ $p_2$ . . . $p_T$] and (c) matrix D is the left-most term of Equation 2, specifically $$D = \begin{bmatrix} I_3 & -d_1 & 0 & \ldots & 0 \\ I_3 & 0 & -d_2 & \ldots & 0 \\ \vdots & \vdots & \vdots & \ddots & \vdots \\ I_3 & 0 & 0 & \ldots & -d_T \end{bmatrix}$$

In illustrative implementations of this invention, the spatial coordinates of the touch point x (which are the first three elements of X (i.e., x, y and z)) may be calculated in accordance with Equation 3.

Single-Sample 3D Touch Detection

In the algorithm described above, the 3D spatial coordinates of a touch point are determined from multiple samples (e.g., more than 20 samples) where each sample is a set of load measurements taken at a particular time. For instance, if the sensor system has three 3-axis load sensor modules, then each sample may comprise 9 items of data, specifically the x, y and z components of the load measured by each of the three 3-axis load sensor modules. In some cases, the multiple samples are taken over a short time interval (e.g. 0.25 seconds).

In some cases, after multiple touch points have been detected and stored in memory, the sensor system may detect a new 3D touch point based on a single, new sample and on data regarding the stored touch points.

To detect a 3D touch point with a single sample, the sensor system may exploit information about what we sometimes call "registered touch points". Data regarding the registered touch points may be known based on previous measurements and may be stored in memory (e.g., before measurements for the single new sample are taken). For instance, the data that is stored in memory for a registered touch point may comprise: (a) 3D spatial coordinates of the registered touch point; and (b) data indicative of the direction of a force line associated with the registered touch point. For instance, the data that is indicative of direction of a force line associated with a registered touch point may comprise: (a) a normalized direction vector associated with the registered touch point or (b) 3D spatial coordinates of a point at which the force line intersects the sensor plane.

In some implementations of this invention, an object may be resting on a sensor surface and may have a set of registered touch points (e.g., $x_1$, $x_2$, etc.). These registered touch points (and force lines associated with them) may be stored in memory.

Consider the following example (Example 1). In Example 1, a computer monitor is resting on a sensor surface. In Example 1, a set of registered touch points (e.g., $x_1$, $x_2$, etc.) are located on an external surface of the monitor and have spatial coordinates that are already known. For instance, in Example 1, the set of registered touch points includes registered touch point $x_1$, which is a physical point on an edge of the monitor that functions as a virtual on/off power switch. In Example 1, when the user presses a finger against registered touch point $x_1$, a computer recognizes this as an instruction to toggle the monitor on or off. In Example 1, because data about registered touch points is already stored in memory, a computer may detect a touch at touch point $x_1$, based on a new, single sample.

In some implementations of this invention, the 3D spatial coordinates of a touch point are detected based on a single sample, as follows.

First, a set of multiple (e.g., three) 3-axis load sensors may take a new, single sample. The single sample may consist of x, y and z load measurements taken by the multiple 3-axis load sensors at a single time stamp.

Second, a new force line may be computed, based on this single sample.

Third, a small set of candidate points may be selected, from a larger set of replacement touch points. The candidate point(s) may consist of all of the registered touch points that are located inside a right circular cylinder whose central axis is the new force line and whose radius is a specified threshold. The radius may have been previously chosen in such a way that the cylinder is likely to include only a small number of candidate points. For instance, in some use scenarios, the radius may be 30 millimeters.

Fourth, the touch point may be selected by choosing the candidate point whose line of force has a direction that is most similar to the direction of the new line of force. To do so, a computer may, for each specific candidate point, calculate the inner product (i.e., dot product) of: (a) the normalized direction vector for the new force line; and (b) the normalized direction vector for the specific candidate point. The candidate point that has the largest dot product (calculated as described in the preceding sentence) may be selected as the touch point.

Figure 5:
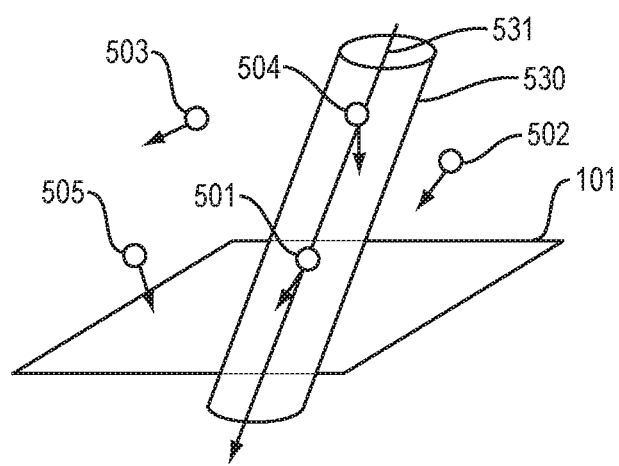
FIG. 5 illustrates detecting a 3D touch point, based on a single new sample and on stored data regarding registered touch points.

FIG. 5 illustrates detecting a 3D touch point, based on a single new sample and on stored data regarding registered touch points. In FIG. 5, data regarding registered touch points (e.g., 501, 502, 503, 504, 505) is stored in memory. In FIG. 5, load sensors take a single new sample. This single new sample may consist of load measurements that are taken by multiple 3-axis load sensors simultaneously (all at the same time). In FIG. 5, a computer calculates a new force line 531, based on the single new sample. The computer selects a small set of candidate points (501, 504) from the larger set of registered touch points. These candidate points are the registered touch points (501, 504) that are inside cylinder 530. The central axis of cylinder 530 is the new force line 531. The radius of cylinder 530 was previously selected in such a way that only a small number of registered touch points are likely to be inside the cylinder. In FIG. 5, the computer: (a) determines which candidate point has a force line that is most similar in direction to the new force line; and (b) selects this candidate point as the touch point for the new sample.

Flowchart

Figure 6:
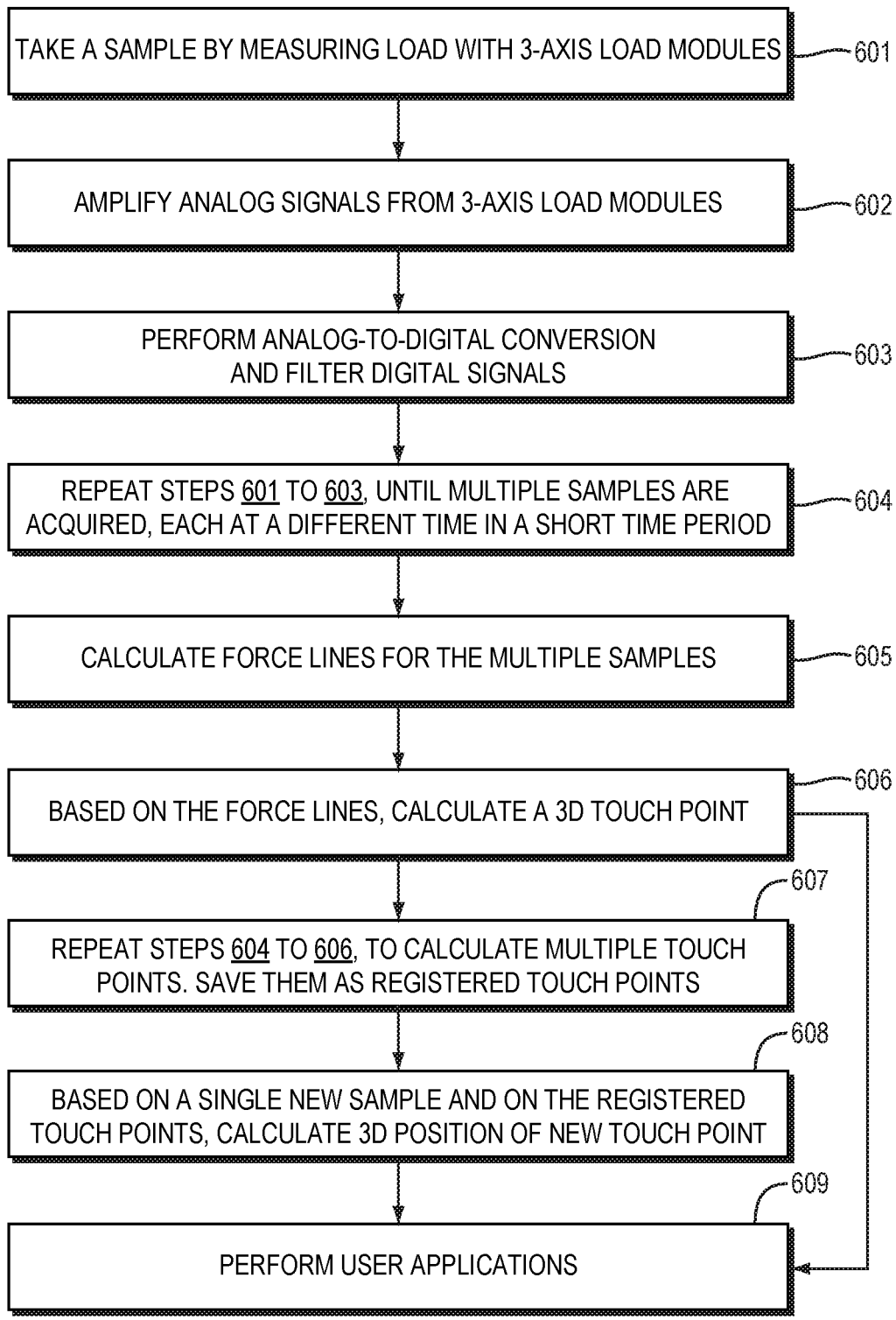
FIG. 6 is a flowchart of a method for detecting a 3D touch point.

FIG. 6 is a flowchart of a method for detecting a 3D touch point. In the example shown in FIG. 6, the method includes at least the following steps: Take a sample by measuring load with 3-axis load modules (Step 601). Amplify analog signals from 3-axis load modules (Step 602). Perform analog-to-digital conversion and filter digital signals (Step 603). Repeat steps 601 to 603, until multiple samples are acquired, each at a different time in a short time period (Step 604). Calculate lines of force for the multiple samples (Step 605). Based on the force lines, calculate a 3D touch point (Step 606). Repeat steps 604-606, to calculate multiple touch points. Save them as registered touch points (Step 607). Based on a single new sample and on the registered touch points, calculate 3D position of the new touch point (Step 608). Perform user applications (Step 609).

For example, in FIG. 6, any of a wide variety of user applications may be performed in Step 609. Here are some non-limiting examples.

In some cases, in Step 609, after a computer detects 3D spatial coordinates of a touch point, the computer may compare the touch point to a database of stored points, each of which is associated with a specific HCI (human-computer interaction) instruction. For instance, a computer may determine that the detected touch point is located within a threshold distance of a stored point that is associated with an instruction to increase the volume of an audio speaker. Each time that the user touches the touch point, the computer may cause the volume of sound outputted by the audio speaker to increase. Or, for instance, a computer may determine that the detected touch point is located within a threshold distance of a stored point that is associated with an instruction to toggle a computer monitor screen on/off. Each time that the user touches the touch point, the computer may toggle the monitor screen on or off. In each case described in this paragraph, the touch point may be on an external surface of a physical object (e.g., a computer monitor) that is resting on the sensor surface. The touch point may be in a physical region that itself does not include any sensors. For example, the touch point may be part of a plastic outer edge of the physical object.

In other cases, in Step 609, detected touch points are used to determine the shape of a physical object. For instance, a user may touch multiple points on an object resting on a sensor structure. Based on load measurements taken at different times while the user presses against different touch points, a computer may estimate 3D spatial coordinates of each of these touch points. The computer may estimate the 3D shape of all or part of the object, based on these multiple touch points. For instance, the computer may calculate a surface that intersects each of the detected touch points. The detected shape of the physical object may be employed to create a CAD (computer-aided design) model of the physical object, which in turn may be employed for rapid prototyping (e.g., to control a 3D printer that prints a replica of the physical object).

In yet other cases, in Step 609, detected touch points are used to identify or classify a physical object. For instance, a user may touch multiple points on a physical object resting on a sensor structure. Based on load measurements taken at different times while the user presses against different touch points, a computer may estimate 3D spatial coordinates of each of these touch points. The computer may compare the detected touch points to a database of stored objects, to identify or classify the physical object.

Prototype

The following six paragraphs describe a prototype of this invention.

In this prototype, each load-sensitive sensor module includes a three-axis load cell (FNZ100N) with a load capacity of 10 kg, and three amplifiers (HX711) with analog-digital converters in a fast mode at 80 Hz. Each sensor module is cuboid with a 90×90×35 mm form factor. Each sensor module includes a PCB (printed circuit board) housed inside a 3d-printed cabinet. The top and bottom surfaces of each sensor module are covered with layered rubber, to increase the grip between each sensor module and the floor or object.

In this prototype, the load-sensitive sensor modules are connected to a single controller with ethernet cables. The cables each have a detachable connector so that a user can easily reconfigure the number and the placement of modules. In this prototype, a single controller is connected with up to 8 modules, which in turn enables the prototype to be scalable in weight tolerance and to handle a variety of spatial configurations.

In this protype, a controller contains a microprocessor (Teensy® 3.6) that aggregates and pre-processes raw data from the sensor modules, and then transmits the pre-processed data to a host computer.

In this prototype, software for real time signal processing and a graphical user interface (GUI) is implemented on an open-source library (openFramework) in C++, except that a motion pattern recognition feature is implemented in a Matlab® environment.

In this prototype, the GUI provides three different primitive modes (touch detection, object status tracking, and motion pattern recognition), and a user may develop an integrated system on top of these three basic functions.

In this prototype, for all primitive modes, the user may interactively register a current touch point or object to the database and selectively serialize the registered touch points for further analysis for other applications.

The prototype described in the preceding six paragraphs is a non-limiting example of this invention. This invention may be implemented in many other ways.

Software

In the Computer Program Listing above, three computer program files are listed. These three computer program files comprise software employed in a prototype of this invention.

In order to submit these three programs to the U.S. Patent and Trademark Office, the three program files were converted to ASCII .txt format. In each of these three programs, these changes may be reversed, so that the three programs may be run. Specifically, these changes may be reversed by: (a) for each of the three files, changing the filename extension from ".txt" to ".hpp"; (b) in the ActionLine program, deleting the phrase "height to point from line" and replacing it with the phrase " ★ height to point from line"; and (c) in the IntersectionFinder program, deleting the phrase "123456" and replacing it with the phrase " ★ ★ ★ ★ ★ ★ " both times it occurs. In some cases, after a filename extension is changed to .hpp to create a header file, code from the header file is inserted into another software program. For instance, the other software program may perform an application described above (e.g., HCI input to control a device, shape detection, or creating a CAD file for rapid prototyping).

This invention is not limited to the software set forth in the computer program files discussed above. Other software may be employed. Depending on the particular implementation, the software used in this invention may vary.

Computers

In illustrative implementations of this invention, one or more computers (e.g., servers, network hosts, client computers, integrated circuits, microcontrollers, controllers, microprocessors, field-programmable-gate arrays, personal computers, digital computers, driver circuits, or analog computers) are programmed or specially adapted to perform one or more of the following tasks: (1) to calculate the 3D spatial coordinates of a touch point, based on load measurements, (2) to control the operation of, or interface with, hardware components of a load sensor system, including any load cell or ADC; (3) to receive data from, control, or interface with one or more sensors; (4) to perform any other calculation, computation, program, algorithm, or computer function described or implied herein; (5) to receive signals indicative of human input; (6) to output signals for controlling transducers for outputting information in human perceivable format; (7) to process data, to perform computations, and to execute any algorithm or software; and (8) to control the read or write of data to and from memory devices (tasks 1-8 of this sentence being referred to herein as the "Computer Tasks"). The one or more computers (e.g. 120, 150) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For instance, in some cases, instructions encoded in a tangible, non-transitory, computer-accessible medium comprise instructions for a computer to perform the Computer Tasks.

Network Communication

In illustrative implementations of this invention, one or more electronic devices (e.g., 100, 120, 150) are configured for wireless or wired communication with other devices in a network.

For example, in some cases, one or more of these electronic devices include a wireless module for wireless communication with other devices in a network. Each wireless module may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables and wiring.

In some cases, one or more computers (e.g. 120, 150) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UMTS (universal mobile telecommunication system), CDMA (code division multiple access, including IS-95, IS-2000, and WCDMA), LTE (long term evolution), or 5G (e.g., ITU IMT-2020).

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To say that a calculation is "according to" a first equation means that the calculation includes (a) solving the first equation; or (b) solving a second equation, where the second equation is derived from the first equation. Non-limiting examples of "solving" an equation include solving the equation in closed form or by numerical approximation or by optimization of by a pseudo-inverse matrix method.

To compute "based on" specified data means to perform a computation that takes the specified data as an input.

As used herein, a "body part" means a part of a human body. For instance, a finger is a "body part". Also, for instance, a hand is a "body part".

The term "comprise" (and grammatical variations thereof) shall be construed as if followed by "without limitation". If A comprises B, then A includes B and may include other things.

A digital computer is a non-limiting example of a "computer". An analog computer is a non-limiting example of a "computer". A computer that performs both analog and digital computations is a non-limiting example of a "computer". However, a human is not a "computer", as that term is used herein.

"Computer Tasks" is defined above.

"Defined Term" means a term or phrase that is set forth in quotation marks in this Definitions section.

For an event to occur "during" a time period, it is not necessary that the event occur throughout the entire time period. For example, an event that occurs during only a portion of a given time period occurs "during" the given time period.

The term "e.g." means for example.

Each equation above may be referred to herein by the equation number set forth to the right of the equation. Non-limiting examples of an "equation", as that term is used herein, include: (a) an equation that states an equality; (b) an inequation that states an inequality; (c) a mathematical statement of proportionality or inverse proportionality; (d) a system of equations; (e) a mathematical optimization problem; or (f) a mathematical expression.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, so that they each may be referred to later with specificity (e.g., by referring to "the first" thing and "the second" thing later). For example, if a device has a first socket and a second socket, then, unless the context clearly indicates otherwise, the device may have two or more sockets, and the first socket may occur in any spatial order relative to the second socket. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"Load measurement" means a measurement of a load.

As used herein, a single scalar is not a "matrix".

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

As used herein, to say that an object "rests" on a structure means that the structure supports at least part of the weight of the object.

As used herein, the term "set" does not include a group with no elements.

Unless the context clearly indicates otherwise, "some" means one or more.

As used herein, a "subset" of a set consists of less than all of the elements of the set.

The term "such as" means for example.

"3D" means three-dimensional.

To say that a machine-readable medium is "transitory" means that the medium is a transitory signal, such as an electromagnetic wave.

A matrix may be indicated by a bold capital letter (e.g., D). A vector may be indicated by a bold lower case letter (e.g., α). However, the absence of these indicators does not indicate that something is not a matrix or not a vector.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) one or more steps in the method are done in parallel or serially; (5) any step in the method is performed iteratively; (6) a given step in the method is applied to the same thing each time that the given step occurs or is applied to a different thing each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method comprising: (a) taking a set of samples, each sample at a different time, in such a way that each sample in the set consists of measurements taken by load cells in a sensor while (i) a body part that is shaking touches a physical object, and (ii) the shaking body part exerts mechanical force against the physical object, which force is transmitted through the object to the sensor; and (b) calculating, based on the samples, three-dimensional (3D) spatial coordinates of a point (touch point) at which the shaking body part touches the physical object, the touch point being located in such a way that at least part of the physical object is between the touch point and the sensor. In some cases: (a) the shaking body part causes the force to fluctuate in direction; and (b) each sample in the set measures the force at a different time, while the force is oriented in a 3D direction different than that for at least one other sample in the set. In some cases, the touch point is at a distance from the sensor, which distance is at least 5 centimeters. In some cases, the calculating involves solving a least squares problem. In some cases, the calculating involves performing a Moore-Penrose pseudo-inverse matrix algorithm with generalized Tikhonov regularization. In some cases, the method further comprises: (a) repeating steps (a) and (b) of claim 1, until 3D spatial coordinates for each of multiple touch points are calculated; (b) saving information about each of the multiple touch points (registered touch points) in memory; (c) taking an additional sample which consists of measurements taken by the load cells in the sensor while the body part that is shaking touches the physical object throughout a region of the object; and (d) calculating, based on the additional sample and on the information about the registered touch points, 3D spatial coordinates of a point in the region. In some cases, the method further comprises: (a) repeating steps (a) and (b) of claim 1, until 3D spatial coordinates for each of multiple touch points on an external surface of the physical object are calculated; and (b) computing, based on the multiple touch points, a shape of all or part of the physical object. In some cases, the method further comprises: (a) repeating steps (a) and (b) of claim 1, until 3D spatial coordinates for each of multiple touch points on an external surface of the physical object are calculated; (b) generating, based on the multiple touch points, a computer-aided design (CAD) file; and (c) causing a physical structure to be fabricated in accordance with the CAD file. In some cases, the method further comprises: (a) employing a lookup table to find an instruction associated with the touch point; and (b) causing a device to perform an action in accordance with the instruction. In some cases, the loads cells comprise at least three 3-axis load sensors, each 3-axis load sensor being configured to measure load along three axes that are perpendicular to each other. Each of the cases described above in this paragraph is an example of the method described in the first sentence of this paragraph, and is also an example of an embodiment of this invention that may be combined with other embodiments of this invention.

In some implementations, this invention is a method comprising: (a) taking a set of samples, each sample at a different time, in such a way that each sample in the set consists of measurements taken by load cells in a sensor while (i) a body part that is shaking touches a physical object, and (ii) the physical object rests on the sensor; and (b) calculating, based on the samples, three-dimensional (3D) spatial coordinates of a point (touch point) at which the shaking body part touches the physical object, the touch point being vertically higher than the sensor and not touching the sensor. In some cases, each sample in the set measures a force which: (a) is due to the body part touching the specific region; and (b) is in a 3D direction different than that for at least one other sample in the set. Each of the cases described above in this paragraph is an example of the method described in the first sentence of this paragraph, and is also an example of an embodiment of this invention that may be combined with other embodiments of this invention.

In some implementations, this invention is an apparatus comprising: (a) load sensors that include a set of at least three 3-axis load cells; and (b) a structure that houses the load sensors; and (c) one or more computers; wherein: (i) the load sensors are configured to take a set of samples, each sample at a different time, in such a way that each sample in the set consists of measurements taken by load sensors while (A) a body part that is shaking touches a physical object, and (B) the shaking body part exerts mechanical force against the physical object, which force is transmitted through the object to the load sensors, and (ii) the one or more computers are programmed to a perform a calculation that computes, based on the samples, three-dimensional (3D) spatial coordinates of a point (touch point) at which the shaking body part touches the physical object. In some cases, the load sensors are configured to take the samples while the force is fluctuating in direction, in such a way that each sample in the set measures the force while the force is oriented in a 3D direction different than that for at least one other sample in the set. In some cases, the calculation involves solving a least squares problem. In some cases, the calculation involves performing a Moore-Penrose pseudo-inverse matrix algorithm with generalized Tikhonov regularization. In some cases, the apparatus is further configured: (a) to take load measurements for, and to estimate 3D spatial coordinates of, each of multiple touch points, which touch points include the touch point mentioned in claim 13; (b) to save information about each of the multiple touch points (registered touch points) in memory; (c) to take an additional sample which consists of measurements taken by the load cells in the sensor while the body part that is shaking touches the physical object throughout a region of the object; and (d) to calculate, based on the additional sample and on the information about the registered touch points, 3D spatial coordinates of a point in the region. In some cases, the apparatus is further configured: (a) to take load measurements for, and to estimate 3D spatial coordinates of, each of multiple touch points; and (b) to compute, based on the multiple touch points, a shape of all or part of the physical object. In some cases: (a) the load cells are configured to take load measurements for each of multiple touch points on an external surface of the physical object, which touch points include the touch point mentioned in claim 13; and (b) the one or more computers are programmed (i) to estimate 3D spatial coordinates of each of the multiple touch points, (ii) to generate, based on the multiple touch points, a computer-aided design (CAD) file, and (iii) to output signals that encode instructions to cause an object to be fabricated in accordance with the CAD file. In some cases, the one or more computers are further programmed to: (a) employ a lookup table to find an instruction associated with the touch point; and (b) to cause a device to perform an action in accordance with the instruction. Each of the cases described above in this paragraph is an example of the apparatus described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including any hardware, hardware components, methods, processes, steps, software, algorithms, features, and technology) that are described herein.

What is claimed:

1. A method comprising:
 (a) taking a set of samples, each sample at a different time, in such a way that each sample in the set consists of measurements taken by load cells in a sensor while (i) a body part that is shaking touches a physical object, and (ii) the shaking body part exerts mechanical force against the physical object, which force is transmitted through the physical object to the sensor; and
 (b) calculating, based on the samples, three-dimensional (3D) spatial coordinates of a point at which the shaking body part touches the physical object, the point being located in such a way that at least part of the physical object is between the point and the sensor;
 wherein
 (i) the shaking body part causes the force to fluctuate in direction, and
 (ii) each sample in the set measures the force at a different time, while the force is oriented in a 3D direction different than that for at least one other sample in the set.

2. A method comprising:
 (a) taking a set of samples, each sample at a different time, in such a way that each sample in the set consists of measurements taken by load cells in a sensor while (i) a body part that is shaking touches a physical object, and (ii) the shaking body part exerts mechanical force against the physical object, which force is transmitted through the physical object to the sensor; and
 (b) calculating, based on the samples, three-dimensional spatial coordinates of a point at which the shaking body part touches the physical object, the point being located in such a way that at least part of the physical object is between the point and the sensor;
 wherein the calculating involves performing a Moore-Penrose pseudo-inverse matrix algorithm with generalized Tikhonov regularization.

3. A method comprising:
 (a) taking a set of samples, each sample at a different time, in such a way that each sample in the set consists of measurements taken by load cells in a sensor while (i) a body part that is shaking touches a physical object, and (ii) the shaking body part exerts mechanical force against the physical object, which force is transmitted through the physical object to the sensor; and
 (b) calculating, based on the samples, three-dimensional (3D) spatial coordinates of a point at which the shaking body part touches the physical object, the point being located in such a way that at least part of the physical object is between the point and the sensor;
 wherein the method further comprises
 (i) repeating steps (a) and (b), until 3D spatial coordinates for each of multiple points are calculated,
 (ii) saving information about each of the multiple points (registered touch points) in memory,
 (iii) taking an additional sample which consists of measurements taken by the load cells in the sensor while the body part that is shaking touches the physical object throughout a region of the object, and (iv) calculating, based on the additional sample and on the information about the registered touch points, 3D spatial coordinates of a location in the region.

4. A method comprising:
(a) taking a set of samples, each sample at a different time, in such a way that each sample in the set consists of measurements taken by load cells in a sensor while (i) a body part that is shaking touches a physical object, and (ii) the shaking body part exerts mechanical force against the physical object, which force is transmitted through the physical object to the sensor; and
(b) calculating, based on the samples, three-dimensional (3D) spatial coordinates of a point at which the shaking body part touches the physical object, the point being located in such a way that at least part of the physical object is between the point and the sensor;
wherein the method further comprises
(i) repeating steps (a) and (b), until 3D spatial coordinates for each of multiple points on an external surface of the physical object are calculated, and
(ii) computing, based on the multiple points, a shape of all or part of the physical object.

5. A method comprising:
(a) taking a set of samples, each sample at a different time, in such a way that each sample in the set consists of measurements taken by load cells in a sensor while (i) a body part that is shaking touches a physical object, and (ii) the shaking body part exerts mechanical force against the physical object, which force is transmitted through the physical object to the sensor; and
(b) calculating, based on the samples, three-dimensional (3D) spatial coordinates of a point at which the shaking body part touches the physical object, the point being located in such a way that at least part of the physical object is between the point and the sensor;
wherein the method further comprises
(i) repeating steps (a) and (b), until 3D spatial coordinates for each of multiple points on an external surface of the physical object are calculated,
(ii) generating, based on the multiple points, a computer-aided design (CAD) file, and
(iii) causing a physical structure to be fabricated in accordance with the CAD file.

6. A method comprising:
(a) taking a set of samples, each sample at a different time, in such a way that each sample in the set consists of measurements taken by load cells in a sensor while (i) a body part that is shaking touches a physical object, and (ii) the shaking body part exerts mechanical force against the physical object, which force is transmitted through the physical object to the sensor; and
(b) calculating, based on the samples, three-dimensional (3D) spatial coordinates of a point at which the shaking body part touches the physical object, the point being located in such a way that at least part of the physical object is between the point and the sensor;
wherein the method further comprises
(i) employing a lookup table to find an instruction associated with the point, and
(ii) causing a device to perform an action in accordance with the instruction.

7. A method comprising:
(a) taking a set of samples, each sample at a different time, in such a way that each sample in the set consists of measurements taken by load cells in a sensor while (i) a body part that is shaking touches a physical object, and (ii) the physical object rests on the sensor; and
(b) calculating, based on the samples, three-dimensional (3D) spatial coordinates of a point at which the shaking body part touches the physical object, the point being vertically higher than the sensor and not touching the sensor;
wherein each sample in the set measures a force which
(i) is due to the body part touching the specific region, and
(ii) is in a 3D direction different than that for at least one other sample in the set.

8. Apparatus comprising:
(a) load sensors that include a set of at least three 3-axis load cells;
(b) a structure that houses the load sensors; and
(c) one or more computers;
wherein:
(i) the load sensors are configured to take a set of samples, each sample at a different time, in such a way that each sample in the set consists of measurements taken by load sensors while (A) a body part that is shaking touches a physical object, and (B) the shaking body part exerts mechanical force against the physical object, which force is transmitted through the physical object to the load sensors,
(ii) the one or more computers are programmed to a perform a calculation that computes, based on the samples, three-dimensional (3D) spatial coordinates of a point at which the shaking body part touches the physical object, and
(iii) the load sensors are configured to take the samples while the force is fluctuating in direction, in such a way that each sample in the set measures the force while the force is oriented in a 3D direction different than that for at least one other sample in the set.

9. Apparatus comprising:
(a) load sensors that include a set of at least three 3-axis load cells;
(b) a structure that houses the load sensors; and
(c) one or more computers;
wherein:
(i) the load sensors are configured to take a set of samples, each sample at a different time, in such a way that each sample in the set consists of measurements taken by load sensors while (A) a body part that is shaking touches a physical object, and (B) the shaking body part exerts mechanical force against the physical object, which force is transmitted through the physical object to the load sensors,
(ii) the one or more computers are programmed to a perform a calculation that computes, based on the samples, three-dimensional spatial coordinates of a point at which the shaking body part touches the physical object, and
(iii) the calculation involves performing a Moore-Penrose pseudo-inverse matrix algorithm with generalized Tikhonov regularization.

10. Apparatus comprising:
(a) load sensors that include a set of at least three 3-axis load cells;
(b) a structure that houses the load sensors; and
(c) one or more computers;
wherein
(i) the apparatus is configured to take load measurements for, and to estimate three-dimensional (3D) spatial coordinates of, a set of points at which the shaking body part touches the physical object, in such a way that, for each particular point in the set of points
- (A) the load sensors take a set of samples, each sample at a different time, in such a way that each sample in the set consists of measurements taken by load sensors while (I) a body part that is shaking touches a physical object, and (II) the shaking body part exerts mechanical force against the physical object, which force is transmitted through the physical object to the load sensors,
- (B) the one or more computers perform a calculation that computes, based on the samples, 3D spatial coordinates of the particular point, and (ii) the apparatus is further configured
- (A) to save information about the set of points in memory,
- (B) to take an additional sample which consists of measurements taken by the load cells in the sensor while the body part that is shaking touches the physical object throughout a region of the object, and
- (C) to calculate, based on the additional sample and on the information about the set of points, 3D spatial coordinates of a location in the region.

11. Apparatus comprising:
(a) load sensors that include a set of at least three 3-axis load cells;
(b) a structure that houses the load sensors; and
(c) one or more computers;
wherein
- (i) the apparatus is configured to take load measurements for, and to estimate three-dimensional (3D) spatial coordinates of, a set of points at which the shaking body part touches the physical object, in such a way that, for each particular point in the set of points
  - (A) the load sensors take a set of samples, each sample at a different time, in such a way that each sample in the set consists of measurements taken by load sensors while (I) a body part that is shaking touches a physical object, and (II) the shaking body part exerts mechanical force against the physical object, which force is transmitted through the physical object to the load sensors,
  - (B) the one or more computers perform a calculation that computes, based on the samples, 3D spatial coordinates of the particular point, and
- (ii) the one or more computers are programmed to calculate, based on the set of points, a shape of all or part of the physical object.

12. Apparatus comprising:
(a) load sensors that include a set of at least three 3-axis load cells;
(b) a structure that houses the load sensors; and
(c) one or more computers;
wherein
- (i) the apparatus is configured to take load measurements for, and to estimate three-dimensional (3D) spatial coordinates of, a set of points at which the shaking body part touches the physical object, in such a way that, for each particular point in the set of points
  - (A) the load sensors take a set of samples, each sample at a different time, in such a way that each sample in the set consists of measurements taken by load sensors while (I) a body part that is shaking touches a physical object, and (II) the shaking body part exerts mechanical force against the physical object, which force is transmitted through the physical object to the load sensors,
  - (B) the one or more computers perform a calculation that computes, based on the samples, 3D spatial coordinates of the particular point, and
- (ii) the one or more computers are programmed
  - (A) to estimate 3D spatial coordinates of each point in the set of points,
  - (B) to generate, based on the set of points, a computer-aided design (CAD) file, and
  - (C) to output signals that encode instructions to cause an object to be fabricated in accordance with the CAD file.

13. Apparatus comprising:
(a) load sensors that include a set of at least three 3-axis load cells;
(b) a structure that houses the load sensors; and
(c) one or more computers;
wherein:
- (i) the load sensors are configured to take a set of samples, each sample at a different time, in such a way that each sample in the set consists of measurements taken by load sensors while (A) a body part that is shaking touches a physical object, and (B) the shaking body part exerts mechanical force against the physical object, which force is transmitted through the physical object to the load sensors,
- (ii) the one or more computers are programmed to a perform a calculation that computes, based on the samples, three-dimensional spatial coordinates of a point at which the shaking body part touches the physical object, and
- (iii) the one or more computers are further programmed
  - (A) to employ a lookup table to find an instruction associated with the point, and
  - (B) to cause a device to perform an action in accordance with the instruction.

* * * * *